(12) United States Patent
Sheppard

(10) Patent No.: US 11,493,439 B2
(45) Date of Patent: Nov. 8, 2022

(54) OPTICAL SENSING CALIBRATION SYSTEM AND METHOD

(71) Applicant: QinetiQ Inc., Lorton, VA (US)

(72) Inventor: Christopher John Sheppard, Accokeek, MD (US)

(73) Assignee: QinetiQ Inc., Lorton, VA (US)

( * ) Notice: Subject to any disclaimer, the term of this patent is extended or adjusted under 35 U.S.C. 154(b) by 113 days.

(21) Appl. No.: 16/720,692

(22) Filed: Dec. 19, 2019

(65) Prior Publication Data

US 2020/0200678 A1 Jun. 25, 2020

Related U.S. Application Data

(60) Provisional application No. 62/781,970, filed on Dec. 19, 2018.

(51) Int. Cl.
*G01N 21/47* (2006.01)
*G01N 21/27* (2006.01)

(52) U.S. Cl.
CPC ....... *G01N 21/4738* (2013.01); *G01N 21/276* (2013.01); *G01N 2201/062* (2013.01); *G01N 2201/067* (2013.01); *G01N 2201/0612* (2013.01); *G01N 2201/127* (2013.01)

(58) Field of Classification Search
CPC .......... G01N 21/4738; G01N 21/4785; G01N 2201/067; G01N 2201/127; G01N 2021/1793; G01N 21/276; G01J 2005/0051; G01J 3/0205; G01J 3/0297; G01J 3/2823

See application file for complete search history.

(56) References Cited

U.S. PATENT DOCUMENTS

| | | | | |
|---|---|---|---|---|
| 5,716,030 | A | * | 2/1998 | LaFiandra .............. B64G 1/222 244/129.4 |
| 2018/0266944 | A1 | * | 9/2018 | Waxman ................... G01J 3/44 |

* cited by examiner

*Primary Examiner* — Michael A Lyons
*Assistant Examiner* — Amanda Merlino
(74) *Attorney, Agent, or Firm* — The Webb Law Firm

(57) ABSTRACT

An optical sensing system includes at least one electro-optical sensor having an adjustable field of view and at least one reflective member including a diffuse reflector surface positioned within the field of view of the at least one electro-optical sensor. The system also includes at least one controller configured to generate calibration parameters for the at least one electro-optical sensor based on data for at least one exposure detected by the electro-optical sensor when the diffuse reflector surface is within the field of view of the at least one electro-optical sensor. Methods for calculating the calibration parameters and for directly measuring reflectivity of objects in a scene with at least one electro-optical sensor are also disclosed herein.

20 Claims, 7 Drawing Sheets

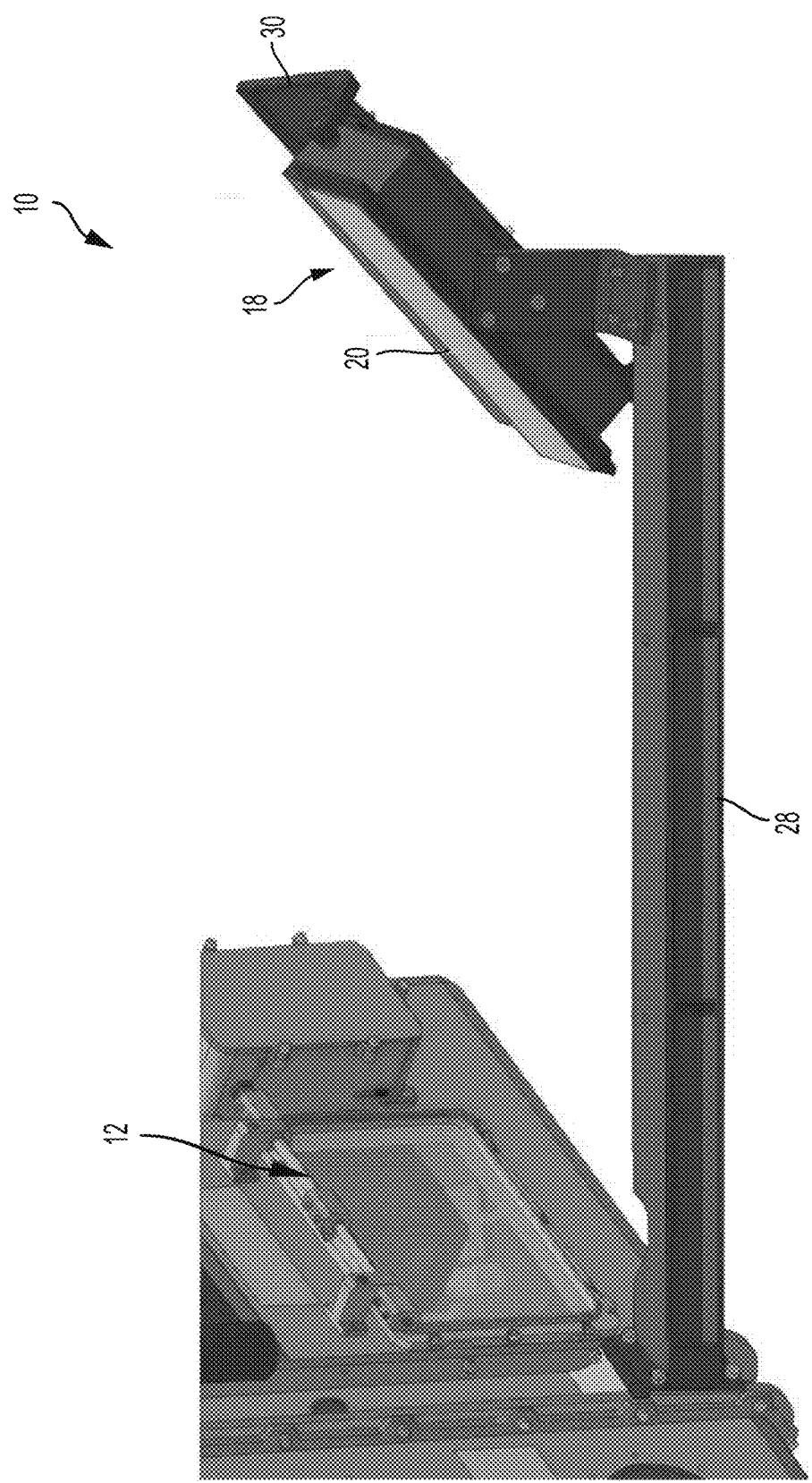

FIG. 3A
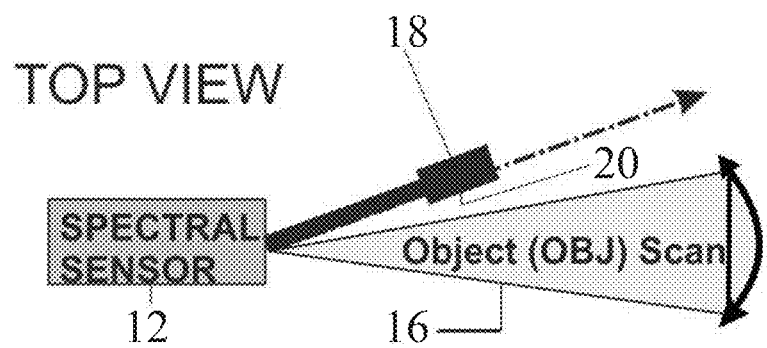
FIG. 3B
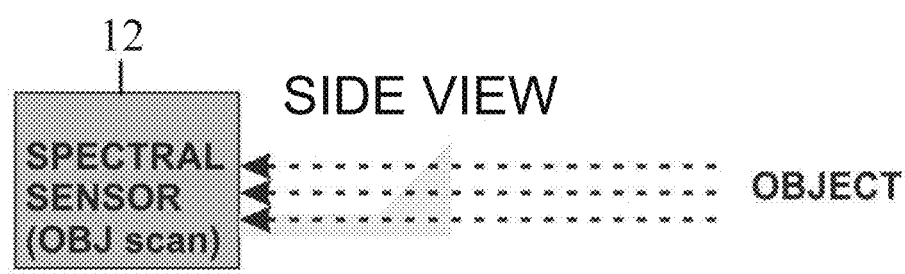
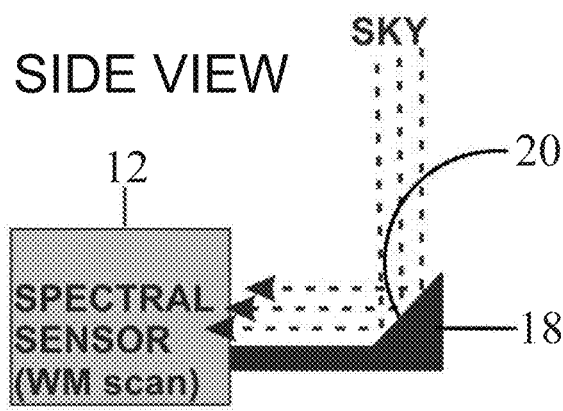
FIG. 3C

OPTICAL SENSING CALIBRATION SYSTEM AND METHOD

CROSS-REFERENCE TO RELATED APPLICATION

This application claims the benefit of U.S. Provisional Patent Application No. 62/781,970, filed Dec. 19, 2018, the disclosure of which is hereby incorporated by reference in its entirety.

BACKGROUND OF THE INVENTION

Technical Field

The present disclosure relates to spectral optical sensing instruments and methods and, in particular, to systems and methods for spectro-radiometric calibration of such optical sensing instruments.

Description of Related Art

An objective of hyperspectral imaging is, from a distance, to produce an image of a scene with each pixel containing the spectral distribution of reflectivity or emissivity for objects in the scene. Such hyperspectral images can be used to differentiate between objects in captured images which, to the eye, may appear to be identical. In particular, hyperspectral imaging methods account for spectral distribution of an illumination source and intervening atmosphere to produce images showing an absolute reflectivity for surfaces of objects within captured images.

Hyperspectral imaging originated for airborne collection of ground targets from directly overhead. In order to capture and analyze such overhead images Quick Atmospheric Correction ("QUAC") methods were developed, by Spectral Sciences Incorporated, to calculate or estimate the absolute reflectivity without measuring spectro-radiometric properties of illumination sources (e.g., downwardly directed radiation). In such QUAC-based systems, there was no direct measurement of the illumination source by an actual sensor focused on the object or surroundings. QUAC method-based optical systems work relatively well for airborne-collected ground scenes containing a statistically diverse mix of vegetation and manmade materials. QUAC-based systems do not work well for a horizontal view path containing sky and manmade materials.

Another method for eliminating atmospheric effects in hyperspectral imaging systems, known as In Scene Atmospheric Correction ("ISAC"), treats the reflective and emissive portions of the spectrum differently. In ISAC-based processes, a scene is assumed to contain a certain number of pixels having an emissivity close to unity, referred to as gray bodies. In systems incorporating ISAC, captured images of a scene are processed to identify a predetermined number of pixels for gray bodies having spectral profiles most closely resembling a black body. The temperature of the identified pixels can be estimated by matching curves to a standard Plank curve. A difficulty when using ISAC-based systems alone is determining the portion of radiance reaching the sensor due to object emissivity and temperature compared to the portion of the detected radiance reflected from the object.

The optical sensing systems and methods disclosed herein are intended to address difficulties of optical systems employing methods such as QUAC and ISAC. For example, these optical sensing systems and methods can produce hyperspectral images accurately reproducing the object spectral characteristics, especially exploiting the improvements in sensor sensitivity.

SUMMARY OF THE INVENTION

According to an aspect of the disclosure, an optical sensing system includes at least one electro-optical sensor having an adjustable field of view; at least one reflective member with a diffuse reflector surface positioned within the field of view of the at least one electro-optical sensor; and at least one controller. The at least one controller is configured to generate calibration parameters for the at least one electro-optical sensor based on data for at least one exposure detected by the electro-optical sensor when the diffuse reflector surface is within the field of view of the at least one electro-optical sensor.

According to another aspect of the disclosure, a method for calculating calibration parameters for at least one electro-optical sensor, includes steps of: obtaining at least one exposure of a diffuse reflector surface by the at least one electro-optical sensor; determining an intensity count for a plurality of pixels for at least one spectral band for the at least one exposure with the diffuse reflector surface within a field of view of the at least one electro-optical sensor; and calculating calibration parameters for the at least one electro-optical sensor based on the determined intensity counts for the plurality of pixels.

According to another aspect of the disclosure, a method for directly measuring reflectivity of objects in a scene with at least one electro-optical sensor includes steps of: obtaining at least one exposure with a diffuse reflector surface within a field of view of the at least one electro-optical sensor; determining an intensity count for a plurality of pixels for at least one spectral band for the at least one exposure with the diffuse reflector surface within the field of view of the at least one electro-optical sensor; adjusting the field of view of the at least one electro-optical sensor so that a scene having an object to be identified is within the adjusted field of view; obtaining at least one exposure of the scene by the at least one electro-optical sensor; determining an intensity count for a plurality of pixels for the at least one spectral band for the obtained at least one exposure of the scene; and dividing the intensity counts for pixels including the object to be identified by the intensity counts for pixels including the diffuse reflector surface to provide a direct measure of reflectivity of a surface of the object to be identified.

Examples of the present invention will now be described in the following numbered clauses:

Clause 1: An optical sensing system comprising: at least one electro-optical sensor comprising an adjustable field of view; at least one reflective member comprising a diffuse reflector surface positioned within the field of view of the at least one electro-optical sensor; and at least one controller configured to generate calibration parameters for the at least one electro-optical sensor based on data for at least one exposure detected by the electro-optical sensor when the diffuse reflector surface is within the field of view of the at least one electro-optical sensor.

Clause 2: The system of clause 1, wherein the calibration parameters for the at least one electro-optical sensor are representative of an amount of spectral/radiometric illumination from the atmosphere in exposures captured by the at least one electro-optical sensor.

Clause 3: The system of clause 1 or clause 2, wherein the data for the at least one exposure detected by the at least one electro-optical sensor comprises an intensity count for a plurality of spatial pixels for at least one spectral band detected by the at least one electro-optical sensor.

Clause 4: The system of clause 3, wherein the at least one spectral band is between 400 nm and 2.5 μm.

Clause 5: The system of clause 3 or clause 4, wherein the calibration parameters are based on data for a plurality of exposures detected by the electro-optical sensor, and wherein the intensity count for each of the plurality of spatial pixels for each spectral band is an average intensity count for each of the plurality of exposures.

Clause 6: The system of any of clauses 1-5, wherein the electro-optical sensor comprises a panning mechanism for adjusting the field of view of the electro-optical sensor, such that the field of view of the electro-optical sensor can be repositioned from a first position, in which the diffuse reflector surface is within the field of view, to a second position, in which the diffuse reflector surface is not within the field of view.

Clause 7: The system of clause 6, wherein an object to be identified is within the field of view of the at least one electro-optical sensor in the second position.

Clause 8: The system of clause 6 or clause 7, wherein the at least one controller is configured to cause the panning mechanism to automatically move the field of view of the electro-optical sensor between the first position and the second position.

Clause 9: The system of any of clauses 1-8, wherein the at least one reflective member comprises a diffuse reflector mirror.

Clause 10: The system of any of clauses 1-9, further comprising an arm supporting the at least one reflective member, which holds the at least one reflective member a fixed distance from the at least one electro-optical sensor.

Clause 11: The system of any of clauses 1-10, further comprising a protective cover mounted to the at least one reflective member, the at least one protective cover being configured to transition between an extended position, in which the at least one protective cover is over the diffuse reflector surface, and a retracted position, in which the at least one protective cover is spaced apart from the diffuse reflector surface exposing the diffuse reflector surface to the field of view of the electro-optical sensor.

Clause 12: The system of clause 11, wherein the at least one controller is configured to cause the at least one protective cover to automatically retract to the retracted position when the reflective member is within the field of view of the at least one electro-optical sensor.

Clause 13: The system of clause 11 or clause 12, further comprising at least one narrow band illumination source connected to the protective cover, wherein the at least one controller is configured to adjust a position of the field of view of the at least one electro-optical sensor so that the narrow band illumination source is within the field of view, thereby also positioning the at least one reflective member within the field of view of the at least one electro-optical sensor.

Clause 14: The system of any of clauses 1-13, wherein after the calibration parameters are calculated, the at least one controller is configured to: adjust a position of the field of view of the at least one electro-optical sensor so that an object to be identified is within the field of view; and cause the at least one electro-optical sensor to detect data for the at least one exposure when the object to be identified is within the field of view of the at least one electro-optical sensor.

Clause 15: The system of clause 14, wherein the data for the at least one exposure when the object to be identified is within the field of view comprises an intensity count for each of a plurality of pixels for at least one spatial band.

Clause 16: The system of clause 15, wherein the at least one controller is configured to determine an absolute reflectivity for each pixel for the object to be identified based on the calibration parameters, the intensity count for each of the plurality of pixels, and, optionally, a dark level for the plurality of pixels.

Clause 17: The system of clause 16, wherein the at least one controller is configured to compare the determined absolute reflectivity for each pixel for the object to be identified to reflectivity values for known objects to identify the object to be identified.

Clause 18: The system of any of clauses 1-17, further comprising at least one temperature sensor configured to detect a temperature of the diffuse reflector surface of the at least one reflective member.

Clause 19: The system of clause 18, wherein the at least one temperature sensor is mounted to the at least one reflective member.

Clause 20: The system of clause 18 or clause 19, wherein the at least one temperature sensor is spaced apart from the reflective member, the system further comprising a thermally conductive member extending between the diffuse reflector surface and the at least one temperature sensor, so that a temperature of the diffuse reflector surface is measured by the spaced apart temperature sensor.

Clause 21: The system of clause 19 or clause 20, wherein the at least one electro-optical sensor comprises at least one infrared sensor configured to detect infrared radiance.

Clause 22: The system of clause 21, wherein the calibration parameters for the infrared sensor are based, at least in part, on data detected by the at least one infrared sensor, a temperature of the diffuse reflector surface measured by the at least one temperature sensor, and known emissivity of the diffuse reflector surface at the measured temperature.

Clause 23: A method for calculating calibration parameters for at least one electro-optical sensor, comprising: obtaining at least one exposure of a diffuse reflector surface by the at least one electro-optical sensor; determining an intensity count for a plurality of pixels for at least one spectral band for the at least one exposure with the diffuse reflector surface within a field of view of the at least one electro-optical sensor; and calculating calibration parameters for the at least one electro-optical sensor based on the determined intensity counts for the plurality of pixels.

Clause 24: The method of clause 23, wherein the calibration parameters for the at least one electro-optical sensor are representative of an amount of spectral/radiometric illumination from the atmosphere in exposures captured by the at least one electro-optical sensor.

Clause 25: The method of clause 23 or clause 24, further comprising detecting dark levels in pixels of the at least one exposure, wherein calculating the calibration parameters comprises removing the detected dark levels from the determining intensity counts for the plurality of pixels.

Clause 26: The method of any of clauses 23-25, further comprising adjusting the field of view of the at least one electro-optical sensor and obtaining at least one exposure for a scene including an object to be identified.

Clause 27: The method of clause 26, further comprising processing the obtained at least one exposure of the scene, based on the calibration parameters, to determine an absolute emissivity for the object to be identified.

Clause 28: The method of any of clauses 23-27, wherein the at least one electro-optical sensor comprises an infrared sensor.

Clause 29: A method for directly measuring reflectivity of objects in a scene with at least one electro-optical sensor, the method comprising: obtaining at least one exposure with a diffuse reflector surface within a field of view of the at least one electro-optical sensor; determining an intensity count for a plurality of pixels for at least one spectral band for the at least one exposure with the diffuse reflector surface within the field of view of the at least one electro-optical sensor; adjusting the field of view of the at least one electro-optical sensor so that a scene comprising an object to be identified is within the adjusted field of view; obtaining at least one exposure of the scene by the at least one electro-optical sensor; determining an intensity count for a plurality of pixels for the at least one spectral band for the obtained at least one exposure of the scene; and dividing the intensity counts for pixels including the object to be identified by the intensity counts for pixels including the diffuse reflector surface to provide a direct measure of reflectivity of a surface of the object to be identified.

Clause 30: The method of clause 29, further comprising detecting a dark level in pixels of exposures captured by the sensor, and subtracting the determined dark level from the intensity count for pixels including the object to be identified.

Clause 31: The method of clause 29 or clause 30, wherein the at least one electro-optical sensor comprises an infrared sensor.

Clause 32: The method of clause 31, further comprising determining a temperature of the diffuse reflector surface, and calculating a portion of radiance due to the temperature of the diffuse reflector surface.

Clause 33: The method of clause 32, further comprising subtracting the calculated radiance due to temperature from the intensity counts for pixels in exposures of the diffuse reflector surface.

BRIEF DESCRIPTION OF THE DRAWINGS

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limit of the invention.

Further features and other examples and advantages will become apparent from the following detailed description made with reference to the drawings in which:

FIG. 1A is a perspective view of components of an optical sensing system, according to an aspect of the disclosure;

FIGS. 3A-3C are schematic drawings showing a reflective member and optical sensor of an optical sensing system, according to aspects of the present disclosure;

DETAILED DESCRIPTION OF THE INVENTION

Figure 1B:
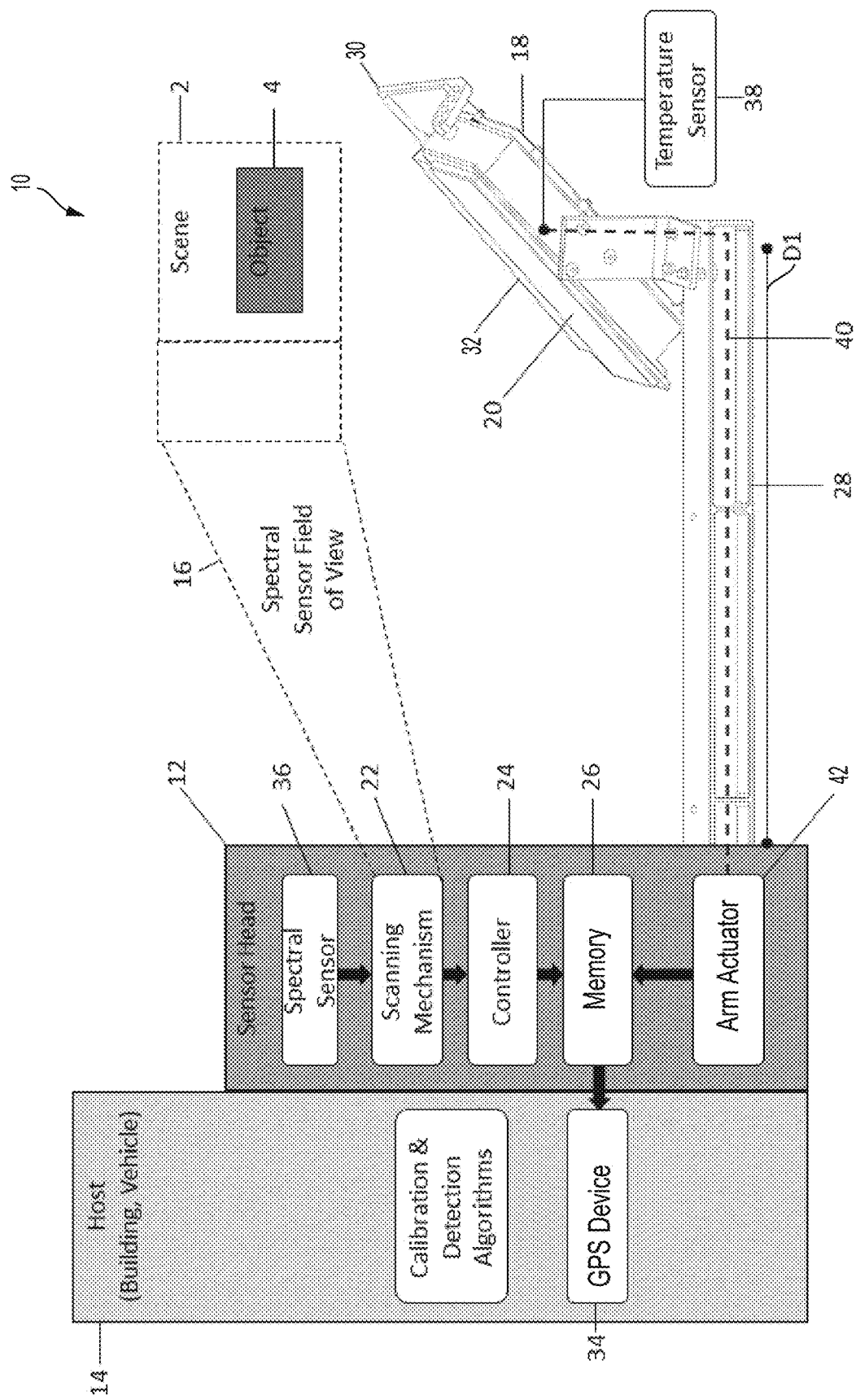
FIG. 1B is a schematic drawing of the optical sensing system of FIG. 1A.

As used herein, the terms "right", "left", "top", "bottom", and derivatives thereof shall relate to the invention as it is oriented in the drawing figures. However, for purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Also, unless indicated otherwise, the disclosure of these ranges is intended as a continuous range including every value between the minimum and maximum values.

As used herein, the terms "comprising," "comprise" or "comprised," and variations thereof, are meant to be open ended. The terms "a" and "an" are intended to refer to one or more.

As discussed previously, an objective of hyperspectral imaging is, from a distance, to produce an image of a scene 2 with each pixel containing the spectral distribution of reflectivity or emissivity for surfaces of object(s) 4 in the scene 2 independent from radiance from an illumination source and/or radiation absorption by the atmosphere. Radiance independent from effects of the illumination source and/or the atmosphere is referred to herein as an absolute reflectivity or absolute emissivity. Further, the present disclosure is directed to an optical sensing system 10 configured to determine calibration parameters for a sensor head comprising an electro-optical sensor 12. The sensor head or sensor 12 can comprise a spectral sensor 36. The calibration parameters are representative of an amount of spectral/radiometric illumination from the atmosphere in scans of objects 4 captured by the electro-optical sensor 12. The optical sensing systems 10 disclosed herein can also be configured to process captured images of scenes 2 to identify objects 4 in the scenes 2 based on known reflectivity for different types of objects.

Unlike traditional optical image systems, the optical sensing systems 10 disclosed herein take advantage of the fact that the same sensor 12 can pan or scan between an illumination source (e.g., the sun/sky), reflected to the sensor 12 by a diffuse reflector surface, and the object 4 to be identified. Using the same sensor 12 for both scans of the diffuse reflector surface and the object 4 allows all calculation to be done in raw numeric counts from the sensor 12, which provides fresh calibration data each time that the sensor 12 pans or scans beyond the scene 2 to the diffuse reflector surface. In contrast, if the sensor(s) 12 were positioned such that a reflector surface reflected radiance from the illumination source (e.g., the sun/sky) directly into aperture(s) of the sensor(s) 12 with no diffusion, only one or a few pixels of the sensor focal array would see or capture the reflected illumination. These pixel(s) would saturate providing no information on the spectral distribution of the downwelling radiance, while the rest of the pixels would not be reporting the spectral content.

An optical sensing system 10 configured to provide calibration parameters that account for radiation properties of illumination sources and the atmosphere in exposures captured by electro-optical sensors 12 is shown in FIGS. 1A and 1B. Calibration is needed because, as sensed or detected at an optical sensor or camera, a spectrally distributed radiance is seen emanating from each point on the object 4. For shorter wavelengths, the reflectivity of the object 4 defines which portion of the sun or other illuminating source spectra is passed towards the sensor or camera. For example, from a red wagon, the sensor or camera detects a portion of sunlight reflected by a paint favoring the spectral region around 630 nanometers (e.g., visible red light). If the same red wagon were illuminated with a green light, the wagon would appear almost black in images captured by the sensor or camera, even though the reflectivity of the red surface has not changed. Instead, the surface appears to be black because there was not any light in the red part of the visible spectrum to reflect the red paint of the wagon. Thus, what the sensor or camera sees or captures of an object's surface depends on the reflective properties of the object 4 in combination with the spectral distribution of the illumination source and absorption of the intervening atmosphere.

Figure 2A:
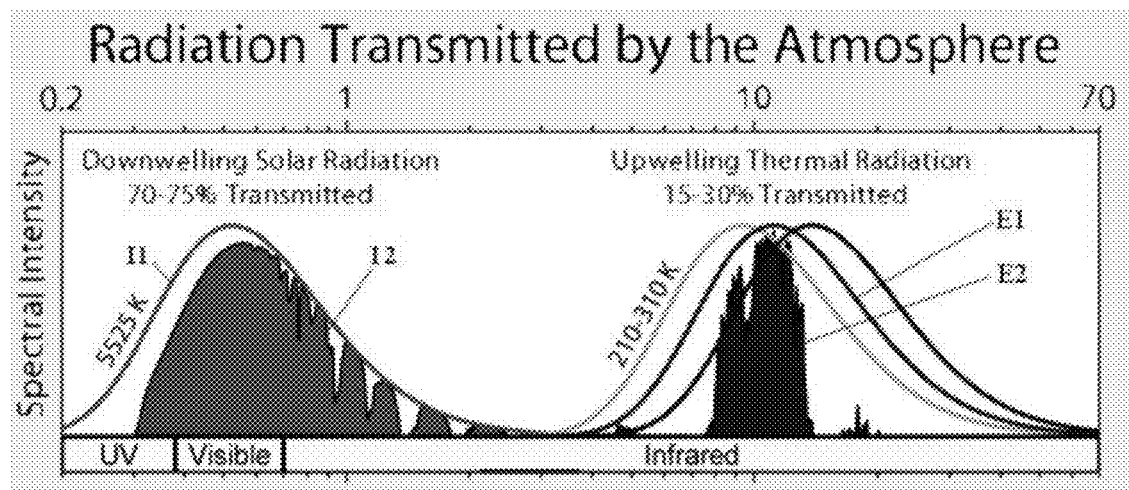
FIG. 2A is a graph showing radiation absorption by the atmosphere for different spectral bands.
Figure 2B:
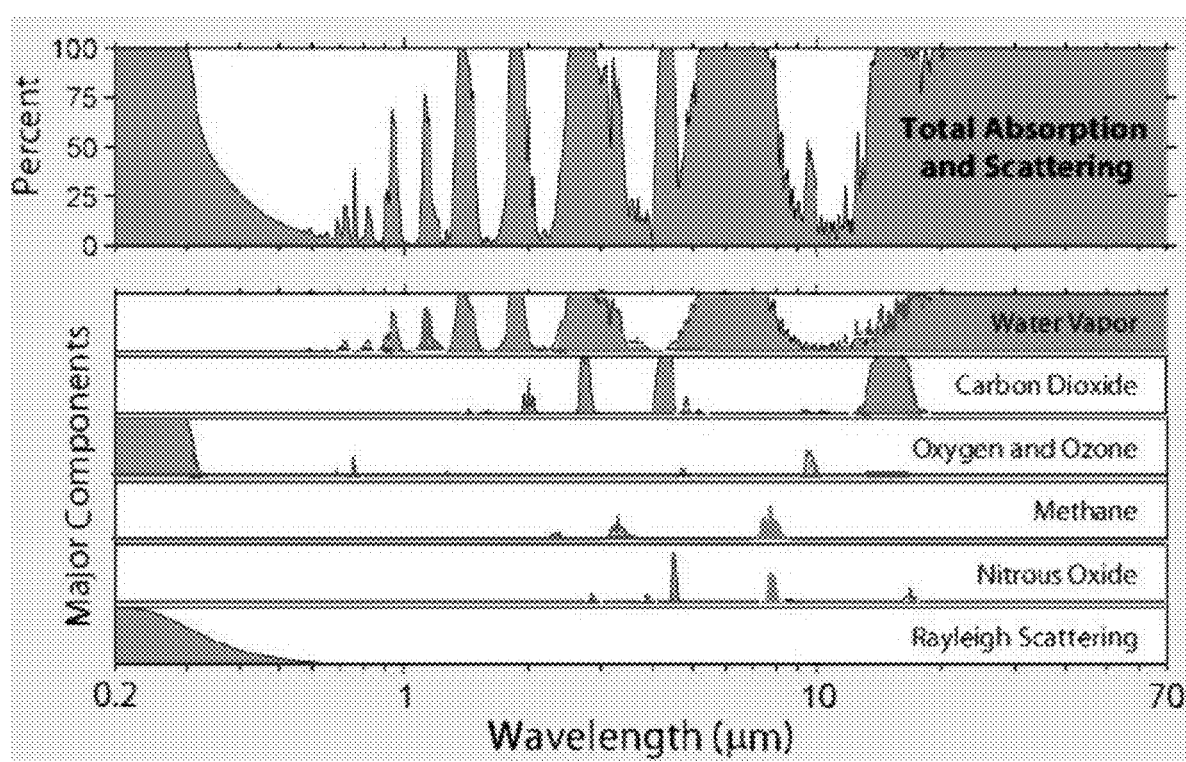
FIG. 2B is a graph showing primary absorption components for radiation transmitted by the atmosphere for different spectral bands.

Graphs showing effects of radiation transmitted through the atmosphere appear in FIGS. 2A and 2B. As shown in FIG. 2A, the line I1 represents illumination from the sun without the atmosphere. The filled-in area and curve I2 represents the measured illumination as seen by a sensor or camera. As shown in FIG. 2A, some portions of the curve I2 are almost entirely absorbed by the atmosphere. Similarly, the line E1 shows emission from an object at ambient temperature without the atmosphere. The filled-in area and curve E2 represent actual emission measured by an infrared sensor due to absorption by the atmosphere along a path between the object and the sensor. FIG. 2B shows primary absorption components of the atmosphere for different radiation wavelengths. The systems 10 and methods disclosed herein are configured to effectively account for and/or remove the effects of the illumination source and the atmosphere from data collected by optical sensors so that absolute reflective or emissive properties of surfaces can be determined.

With reference again to FIGS. 1A and 1B, the optical sensing system 10 can be mounted to or integrated with a host, such as vehicle 14 (e.g., an air vehicle, including, but not limited to, an airplane, helicopter, glider, drone, balloon, or similar vehicle). In some examples, the system 10 comprises a side-view mirror extending from a portion of an aircraft and positioned to see or reflect downwelling radiance to the sensor(s) 12. In other examples, the system 10 can be mounted to a stationary structure, such as a tripod or building.

The optical sensing system 10 comprises the electro-optical sensor 12, which has an adjustable line of sight or field of view 16, and at least one reflective member 18, such as a diffuse reflector mirror comprising a diffuse reflector surface 20, positioned within the field of view 16 of the electro-optical sensor 12. The reflector surface 20 may be designed to fill the entire field of view 16 of the sensor 12, when the sensor 12 is centered on the reflector surface 20. In some examples, the reflector surface 20 is about 8.6 inch×about 4.3 inch. The reflector surface 20 may be positioned a distance D1 of about 24 inches in front of the sensor 12.

Generally, the diffuse reflector surface 20 is configured to spread radiation from a radiation source (e.g., from the sun's reflection) over a wide range of angles. When viewed by the naked eye from the sensor viewpoint, the diffuse reflector surface 20 appears to be white. The sensor 12 is configured to detect diffuse reflectance from the surface 20 and, as described herein, to process exposures captured of the diffuse reflector surface 20 for calibrating the sensor 12.

In some examples, the reflective member 18 comprises a thermally conducting material with a uniformly or substantially uniformly rough surface, such as a surface obtained when metal is subjected to bead blasting. The reflector surface 20 may produce a uniform reflection throughout wavelengths of interest, either through polishing or application of an optical coating. Desirably, the combination of the diffuse surface and optical coating uniformly spreads light from an overhead source (e.g., from the sun) over a broad area rather than a single point so that the entire focal plane of the sensor 12 sees or captures an average downwelling radiance. Roughness of the reflector surface 20 may be selected to provide a correct amount of dispersion. For example, surface roughness may be chosen to be uniformly diffuse, such that radiation from an illumination source (e.g., sun/sky) is diffusely reflected over at least about 40 degrees, instead of about 0.5 degrees prior to striking the reflector surface 20.

The optical sensing system 10 disclosed herein can be adapted to work with and/or can be added to any spectral sensor with a line of sight or field of view 16 that can be moved between the scene 2 and the diffuse reflector surface 20. For example, the sensor 12 can be a spectral sensor of either the non-imaging type (e.g., a Michelson interferometer) or an imaging optical sensor (e.g., a hyperspectral imaging sensor). The at least one electro-optical sensor 12 can be configured to detect data representative of an intensity count for a plurality of spatial pixels for spectral band(s) detected by the sensor 12. The spectral band(s) can be between 400 nm and 2.5 μm. The sensor 12 may be any type of customized or commercially available line scanning imaging spectral sensor. As described in further detail herein, a size and position of the reflector surface 20 relative to an aperture of the sensor 12 can be selected and/or adjusted so that the field of view 16 of the sensor 12 can be used for both downwelling radiance measurements and for calibrating the lsensor 12. An example of a commercial imaging hyperspectral sensor that can be used with the system 10 is the Headwall Hyperspec® family of sensors by Headwall Photonics, Inc. The spectral sensor 36 can also comprise an emissive optical instrument, such as an infrared sensor.

As used herein, a sensor 12 having an "adjustable field of view" refers to a sensor 12 having a field of view 16 that can pan or scan in different directions to capture the extent of the scene 2 without changing the physical position of the sensor itself. For example, the sensor 12 can comprise a panning or scanning mechanism 22 configured to adjust or reposition the field of view 16 of the sensor 12. The panning or scanning mechanism 22 may be operated automatically, without user intervention, so that, for example, images of the reflective member 18 can be periodically captured for calibrating the sensor 12. Once calibration parameters are obtained or updated, the system 10 can be configured to automatically adjust the field of view 16 of the sensor 12 to obtain images of the scene 2 including the objects 4 of interest and/or objects 4 to be identified (referred to herein as an object scan). Specifically, the panning or scanning mechanism 22 can be configured to reposition the field of view 16 of the sensor 12 from a first position, in which the diffuse reflector surface 20 is within the field of view 16, to a second position, in which the object to be identified is seen by the sensor 12 and the diffuse reflector surface 20 is not within the field of view 16.

The optical sensing system 10 further comprises a controller 24 in electronic communication with the electro-optical sensor 12 configured to generate calibration parameters for the sensor 12 based on data for exposures detected by the electro-optical sensor 12 when the diffuse reflector surface 20 is within the field of view 16. The calibration parameters can be representative of an amount of spectral/radiometric illumination from the atmosphere in scans of objects 4 captured by the electro-optical sensor 12. The controller 24 can be a dedicated electronic device, or sensor component, or a general purpose computer processor comprising memory 26. The memory 26 can contain instructions that cause the controller 24 to receive data from the electro-optical sensor 12, process the received data to determine characteristics of exposures captured by the sensor 12, and generate or determine the calibration parameters, as described in further detail herein.

In some examples, the reflective member 18 is mounted to an elongated arm 28 supporting the reflective member 18. The elongated arm 28 is configured to hold the reflective member 18 a fixed distance, such as the distance D1, from the electro-optical sensor 12. As shown in FIG. 1A, the arm 28 can be mounted to a portion of the host or vehicle 14 (e.g., to the body of an aircraft). The arm 28 extends from the vehicle 14 or sensor 12 and holds the reflective member 18 the distance D1 from the electro-optical sensor 12. The arm 28 can be configured to support the reflective member 18 at an angle of about 45 degrees relative to a central axis of the arm 28. In some examples, the arm 28 is fixed in place relative to the vehicle 14. In other examples, the arm 28 may be configured to swing or pivot relative to the vehicle 14 to reposition the reflective member 18. The system 10 may comprise a motorized positioning mechanism, such as an arm actuator 42, for automatically or manually repositioning the arm 28. For example, the arm actuator 42 may move the arm 28 and reflective member 18 out of the line of sight 16 of the sensor 12 so that the sensor 12 can capture images of the scene 2 and object 4. In some examples, the positioning mechanism may be used for performing object scans instead of panning the sensor 12 between the reflective member 18 and the scene 2.

The system 10 can further comprise a protective cover 30 mounted to the reflective member 18. The protective cover 30 may be configured to transition between an extended position, in which the protective cover 30 is extended over the diffuse reflector surface 20, and a retracted position, in which the protective cover 30 is spaced apart from the diffuse reflector surface 20. The protective cover 30 can comprise a rigid or flexible sheet configured to extend over the diffuse reflector surface 20. For example, when activated, the protective cover 30 can slide or unfold over the diffuse reflector surface 20, blocking the field of view 16 of the sensor 12 from "seeing" the diffuse reflector surface 20, thereby protecting the surface 20. The cover 30 can be formed from synthetic materials, such as flexible or rigid plastics, that are sufficiently strong to prevent objects from damaging the reflective member 18 as the vehicle 14 is in use. For example, the protective cover 30 may protect the reflector surface 20 from dust and debris, which may come into contact with the surface 20 during operation of the vehicle 14. The protective cover 30 is generally configured to be extended over the surface 20 whenever the reflective member 18 is not within the field of view 16 of the sensor 12. Accordingly, once calibration parameters for the sensor 12 are calculated, the cover 30 can be extended over the reflective member 18 and the sensor 12 can be used for capturing images of the scene 2 and object 4 to be identified.

In some examples, the controller 24 can be configured to cause the protective cover 30 to automatically retract to the retracted position when the reflective member 18 is within the field of view 16 of the electro-optical sensor 12. When the field of view 16 of the sensor 12 is adjusted to focus on the scene 2, the controller 24 can automatically cause the cover 30 to extend over the diffuse reflector surface 20 for protection.

In some examples, the system 10 further comprises a narrow-band illumination source 32 mounted to and/or embedded into the protective cover 30. The narrow-band illumination source 32, such as a light-emitting diode or laser diode, is provided to enable precise centering of the reflective member 18 relative to an optical line of sight or field of view 16 of the electro-optical sensor 12 being calibrated. For example, the controller 24 may be configured to scan a scene to identify emission from the narrow-band illumination source 32. When the narrow-band illumination source 32 is within the field of view 16, the controller 24 may be configured to cause the protective cover 30 to retract, exposing the diffuse reflector surface 20. The narrow-band illumination source 32 may also be used as an external spectral source for use in spectrally calibrating the electro-optical sensor 12. The wavelength of the narrow-band illumination source 32 should be selected to match a response of the sensor 12 so that when the sensor 12 is turned on, it identifies or detects the narrow-band illumination source 32. For example, in a VNIR-SWIR system (e.g., a system 10 including sensors 12 measuring from about 400 nm to about 3000 nm) the wavelength of the narrow-band illumination source 32 may be anywhere between about 0.4 µm and 2.5 µm allowing a commercially available stable laser diode to be used (e.g., a commercially available 1.62 µm laser diode).

The system 10 may further comprise or be configured to receive location data from a GPS system or device. For example, the controller 24 can receive location information from a GPS device 34 of the vehicle 14. The location information, along with time of day and date information, can be used to determine a best pointing angle for correctly illuminating the reflective member 18. For example, in order to determine the best positioning angle for the reflector surface 20, an algorithm may be used for calculating the azimuth and elevation angles, such that the illumination source (e.g., the sun) as reflected from the reflector surface 20 is less than half the surface diffusion angle and the reflector surface 20 is not in the shadow of the sensor 12.

Obtaining Calibration Parameters and Identifying Objects

As discussed previously, the controller 24 is configured to generate calibration parameters for the electro-optical sensor 12. The calibration parameters are representative of an amount of spectral/radiometric illumination from the atmosphere in scans of objects 4 captured by the electro-optical sensor 12. In one example, calibration parameters are calculated by first obtaining data for an exposure detected by the electro-optical sensor 12 when the diffuse reflector surface 20 is within the field of view 16 of the at least one electro-optical sensor 12. Specifically, the data can be an intensity count for spatial pixels for spectral band(s) detected by the electro-optical sensor 12. The spectral bands can be between 400 nm and 2.5 µm. In some examples, the intensity counts for the pixels can be based on data for a plurality of exposures detected by the electro-optical sensor 12. In that case, the intensity count for each of the plurality of spatial pixels for each spectral band can be an average intensity count determined from the plurality of exposures. Once the average intensity count for each pixel is known, calibration parameters can be determined for each pixel.

When calibration parameters for the sensor 12 are known, images of the scene 2 can be captured and processed using the calculated calibration parameters to obtain hyperspectral images with absolute reflectivity for each pixel for the spectral bands. For example, after the calibration parameters are calculated, the controller 24 can cause the electro-optical sensor 12 to adjust a position of the field of view 16 of the electro-optical sensor 12 so that the object 4 to be identified is within the field of view 16. Once the object 4 is within the field of view 16, the controller 24 can cause the electro-optical sensor 12 to detect data for exposure(s) with the object 4 in the field of view 16. As with previously described exposures, the data can comprise intensity counts within spectral band(s) for each pixel in exposure(s) captured by the electro-optical sensor 12. The controller 24 is configured to determine the spectral reflectance for each pixel for the object to be identified based on the calculated calibration parameters and the intensity count for each of the plurality of pixels detected for the object 4. As described in further detail herein, in some examples, determining absolute reflectivity can also consider a dark level for the plurality of pixels. As used herein, "dark level" may refer to measurements acquired by the sensor 12 after closing the optical path from light sources. The dark level measurement represents a baseline response of the sensor 12, in a no light condition.

Once the absolute reflectivity for the pixels is determined, the controller 24 can be configured to compare the determined absolute reflectivity for each pixel for the object 4 to be identified to the reflectivity values for known objects to identify the object 4 in the scene 2. For example, reflectivity values for objects 4 which may appear in the scene 2 captured by the electro-optical sensor 12 can be stored in a database or memory, such as memory 26 associated with the controller 24. In some examples, a database can be remote from the controller 24 and/or electro-optical sensor 12. For example, the database can be housed on an electrical system of the vehicle 14. In that case, calibration parameters and/or intensity count measurements obtained by the electro-optical sensor 12 can be transmitted to the electrical system of the vehicle 14 for identifying objects 4 in images or data collected by the electro-optical sensor 12.

In some examples, the controller 24 can be configured to directly compute reflectivity from data collected by the electro-optical sensor 12. For this approach, downwelling radiance at the target (e.g., the object 4 to be identified) is assumed to be similar to downwelling radiance at the reflective member 18 and electro-optical sensor 12. Beneficially, since the electro-optical sensor 12 measuring the object radiance is also looking at the downwelling radiance from the reflective member 18, it is possible to avoid calibration steps of performing absolute radiometric calibration for the sensor 12. Instead, the reflective member 18 comprising the diffuse reflector surface 20 presents a fresh static and uniform scene 2 to the sensor 12, which can be directly compared to images or exposures captured by the sensor 12 of the object 4 to be identified.

A simplified diagram showing how the downwelling radiance and scene radiance are collected by the same spectral sensor using the reflective member 18 is shown in FIGS. 3A-3C. As shown in FIG. 3A, which schematically illustrates a top view of the electro-optical sensor 12 and reflective member 18, a field of view 16 of the sensor 12 can be adjusted to scan between the reflective member 18 and the scene 2 including objects 4 to be identified. When the reflective member 18 is within the field of view 16, as shown in FIG. 3C, illumination from the sky transmitted through the atmosphere is reflected from the reflective member 18 to the sensor 12 (referred to as a mirror scan). When the scene 2 is within the field of view 16 of the sensor 12, as shown in FIG. 3B, radiance reflected from the object 4 passes directly to the sensor 12 (referred to as an object scan). In some examples, the controller 24 can be configured to perform the following steps to determine reflectivity of the object(s) to be identified based on the mirror scan and the object scan.

Figure 4:
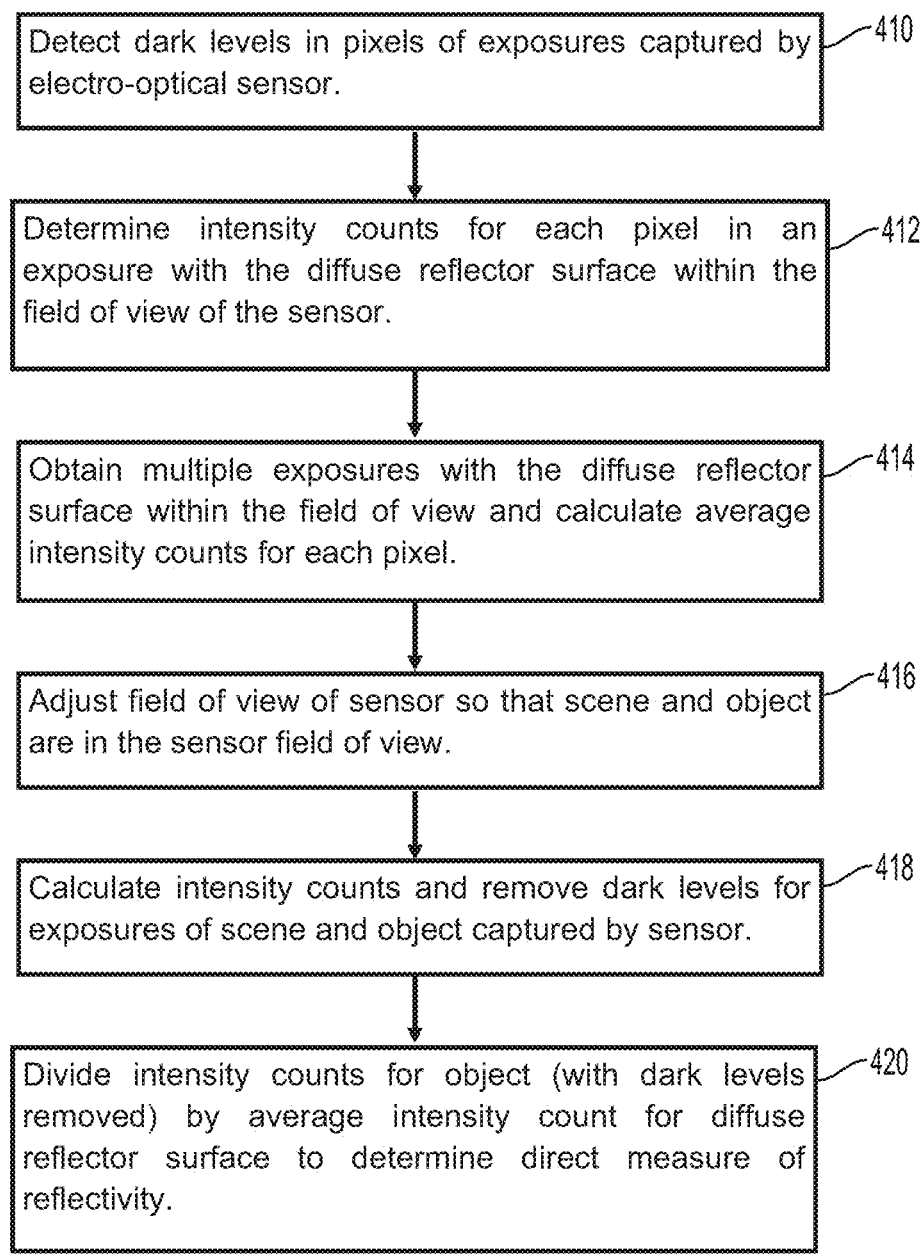
FIG. 4 is a flow chart showing processes for calculating an absolute reflectivity from an object using an optical sensing system, according to an aspect of the present disclosure.

First, at step 410 shown in FIG. 4, the controller 24 is configured to cause the electro-optical sensor 12 to detect dark levels, also referred to as baseline values or offsets, in intensity counts measured for all pixels detected by the sensor 12. As discussed previously, dark levels are measurements acquired by the sensors 12 after closing the optical path from the light source.

Next, at step 412, with the line of sight or field of view 16 of the sensor 12 directed to the reflective member 18 so that sky radiance is diffused by the diffuse reflector surface 20 and so the sun is no longer a point source, the sensor 12 detects and records an intensity count at each spatial pixel for the spectral bands measured by the sensor 12. Optionally, as shown at step 414, multiple exposures can be taken of the reflective member 18 and intensity counts for each pixel can be averaged after subtraction of the dark levels. At step 416, the controller 24 adjusts the field of view 16 of the electro-optical sensor 12 and causes the electro-optical sensor 12 to perform an object scan to obtain data for the object 4 to be identified. At step 418, intensity counts for each pixel in the images of the object 4 to be identified are determined and the dark levels are subtracted from the determined intensity counts. At step 420, intensity counts for pixels for the object 4 to be identified (minus the dark levels) are divided by the average pixel intensity count (minus the dark levels) from the diffuse reflector surface 20 (e.g., the mirror scans), as shown in Equation 1.

$$\text{Absolute reflectance (per pixel)} = \frac{\text{Intensity Count (Object)} - \text{Dark Level}}{\text{Avg. Intensity Count (Mirror)} - \text{Dark Levels}} \quad \text{Equation 1}$$

The resulting values for the pixels provides a direct measure of reflectivity for the object to be identified without needing to calibrate or convert to radiance units. As will be appreciated by those skilled in the art, the processing steps described herein facilitate direct reflectivity computation, which inherently incorporates a fresh calibration each time that the sensor 12 pans to the diffuse reflector surface 20.

Infrared Calibration and Identification

While the inventors believe that the greatest benefit of the optical sensing systems disclosed herein comes from direct measurement of reflectivity, there is also significant benefit from determining downwelling infrared radiance extracted from the reflective member directly and corrected with a temperature of the diffuse reflector surface 20. In particular, for the emissive part of the spectrum, the optical sensing systems 10 disclosed herein provide measurement of the downwelling radiance with the same calibration parameters used to view the object, which significantly reduces errors when ratios are computed. However, since there is no equivalent "dark level" in the emissive part of the spectrum due to the impracticality of black body sources operating at absolute zero temperature, the electro-optical sensor 12 is calibrated using a difference between two black bodies of known temperatures. Other factors, such as a need to conduct ISAC, also requires that calculations be performed in radiance space.

More specifically, for emissive infrared bands detected by the electro-optical sensor 12, the mirror scan of the reflective member 18 can be calibrated to radiance units and portions of the radiance due to emission from the diffuse reflector surface 20 is removed using knowledge of the surface emissivity and temperature. This operation can be performed by dedicated electronics of the electro-optical sensor 12, the controller 24, or by processing components of the electrical system of the vehicle 14.

With reference again to FIGS. 1A and 1B, in order to detect emissivity, the spectral sensor 36 is an infrared sensor configured to detect radiation bands within the infrared spectrum. The system 10 further comprises a temperature sensor 38 configured to detect a temperature of the diffuse reflector surface 20 of the at least one reflective member 18. For example, the temperature sensor 38 can be an electrical sensor, such as a thermistor, as is known in the art. In some examples, the temperature sensor 38 can be mounted to the reflective member 18 to directly measure a temperature at the diffuse reflector surface 20. In that case, the temperature sensor 38 can be in electrical communication with the controller 24 by a wired or wireless interface. In other examples, the temperature sensor 38 can be spaced apart from the diffuse reflector surface 20. In that case, the system 10 can comprise a thermally conductive member 40 extending between the diffuse reflector surface 20 and the temperature sensor 38, so that a temperature of the diffuse reflector surface 20 can be measured by the spaced apart temperature sensor 38. For example, the thermally conductive member 40 may extend along the elongated arm 28 between the reflective member 18 and the infrared sensor. When used for infrared imaging, the reflective member 18 and reflective surface are desirably formed from a conductive material having a high/uniform reflectivity and high thermal conductivity to spread heat uniformly. For example, the reflective member 18 and/or the conductive member 40 may be formed from aluminum.

In order to calculate emissivity, the controller 24 can be configured to calculate calibration parameters based on data detected by the infrared sensor, a temperature of the diffuse reflector surface 20 measured by the temperature sensor 38, and known emissivity of the diffuse reflector surface 20 at the measured temperature.

Figure 5:
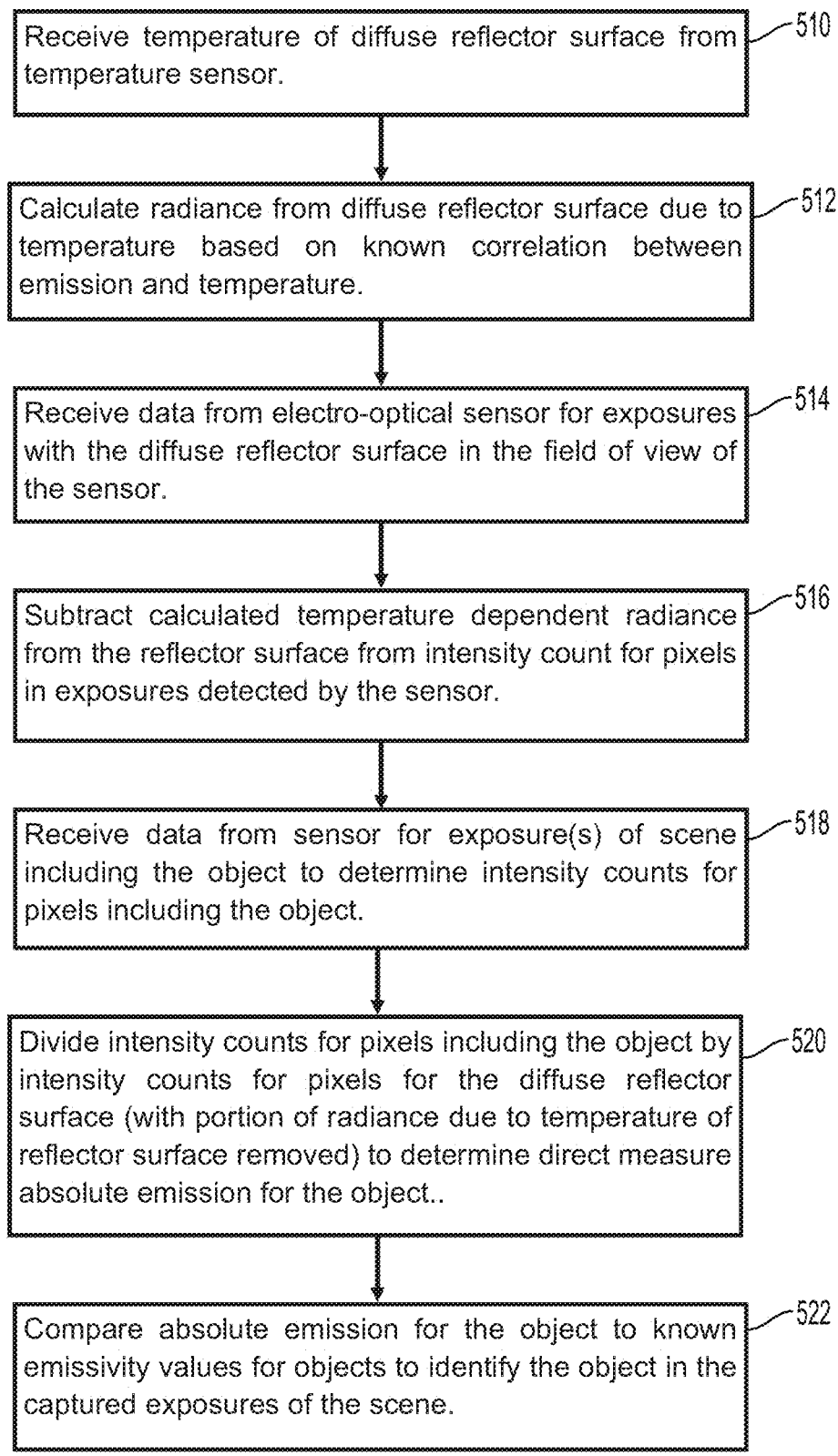
FIG. 5 is a flow chart showing processes for calculating an absolute emissivity from an object using an optical sensing system, according to an aspect of the present disclosure.

For example, at step 510, shown in FIG. 5, the controller 24 can be configured to receive temperature information for the diffuse reflector surface 20 from the temperature sensor 38. At step 512, the controller 24 calculates infrared emission from the diffuse reflector surface 20 based on the known correlation between temperature and emission for the diffuse reflector surface 20. At step 514, the controller 24 receives data from the electro-optical sensor 12 for a mirror scan (e.g., an exposure with the reflective member 18 within the field of view 16 of the spectral sensor 36). As in previous examples, the received data can comprise intensity counts for each pixel in the exposure detected by the spectral sensor 36. At step 516, the temperature dependent emission from the diffuse reflector surface 20 is subtracted from the measured intensity counts for each pixel. The resulting objective intensity count values can be used to calculate calibration parameters for the emission portion of the spectrum. At step 518, in order to directly calculate emissivity for a scene 2, the controller 24 receives data from the spectral sensor 36 for an object scan of the scene 2 including an object 4 to be identified. As in previous examples, the intensity count for each pixel in the received data for the object scan is determined. At step 520, the controller 24 is configured to divide the pixel intensity counts for the object scan by the pixel intensity count for the mirror scan (or average pixel intensity count when multiple exposures are used) modified to remove the portion of radiance due to temperature of the diffuse reflector surface, as shown in Equation 2.

$$\text{Absolute emissivity (per pixel)} = \frac{\text{Intensity Count (Object)}}{\text{Intensity Count (Mirror)} - \text{Radiance}(\textit{Temp.})(\text{Mirror})} \quad \text{Equation 2}$$

As in previous examples, the calculation provides a ratio which corresponds to a direct measure of emission from the object to be identified. At step 522, the calculated emission for each pixel can be compared to emissions for known objects to identify the object 4 in the scene 2.

Example

Given the objective of a spectral sensor is to provide accurate reflectivity or emissivity profiles for comparison against known materials, a metric known as an Adaptive Coherence Estimator (ACE) score is often used as the figure of merit quantifying how well the object signature matches a known library signature. The ACE score ranges between zero and one, with one being a perfect match. More specifically, the ACE score is a measure of how much the pixel's deviation from the background spectrum resembles that of a reference spectrum for a material of interest as opposed to background variability. A high ACE score suggests a pixel represents a material of interest and a low ACE score represents a background pixel. See Cisz and Schott, "Performance Comparison of Hyperspectral Target Detection Algorithms in Altitude Varying Scenes," *Algorithms and Technologies for Multispectral, Hyperspectral, and Ultraspectral Imagery XI* 5806 (2005) 839-849, available at http://core.ac.uk/download/pdf/145021193.pdf.

Figure 6A:
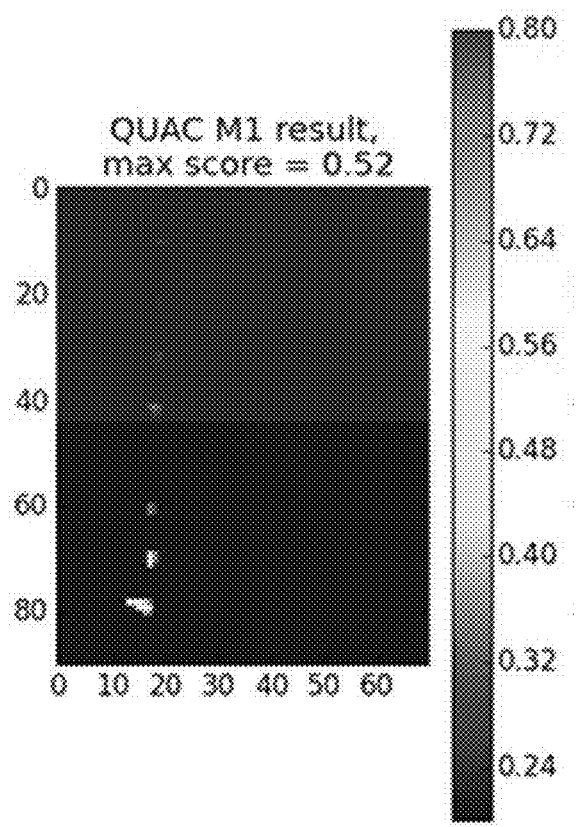
FIGS. 6A and 6B are graphs depicting experimental results obtained by an optical sensing system, according to an aspect of the disclosure.
Figure 6B:
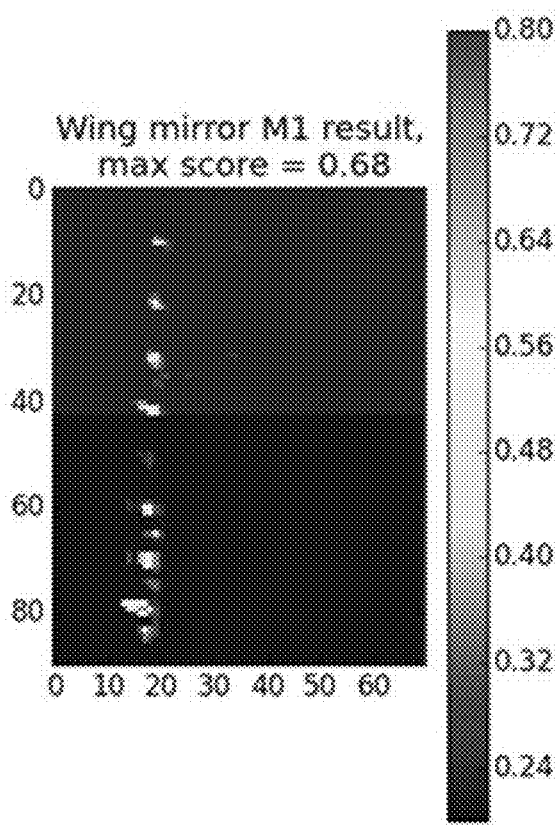

FIGS. 6A and 6B are graphs depicting performance of the optical sensing system comprising the reflective member disclosed herein compared to a traditional QUAC method. The standard QUAC method applied to the data provided an ACE score of 0.52, as shown by FIG. 6A. In contrast, using the optical sensing system comprising the reflective member disclosed herein achieves a score of 0.68, as shown in FIG.

6B, which in itself is a 30% improvement. The most noticeable effect comes in the number of pixels showing up in the detection.

The embodiments of the present disclosure have been described with reference to various examples. Modifications and alterations will occur to others upon reading and understanding the foregoing examples. Accordingly, the foregoing examples are not to be construed as limiting the disclosure.

The invention claimed is:

1. An optical sensing system for determining at least one characteristic of an object, the system comprising:
   at least one electro-optical sensor comprising an adjustable field of view;
   at least one reflective member comprising a diffuse reflector surface; and
   at least one controller comprising a processor and computer readable memory comprising instructions that when executed cause the processor to:
   adjust the field of view of the at least one electro-optical sensor to obtain at least one exposure with the diffuse reflector surface within the field of view of the at least one electro-optical sensor;
   determine spectral/radiometric illumination present on the diffuse reflector surface as recorded by pixels of a focal plane of the at least one electro-optical sensor based on data for the at least one exposure when the diffuse reflector surface is within the field of view of the at least one electro-optical sensor;
   adjust the field of view of the at least one electro-optical sensor to obtain at least one exposure of the object; and
   determine at least one characteristic of the object based on the determined spectral/radiometric illumination for the pixels of the at least one exposure when the diffuse reflector surface is within the field of view of the at least one electro-optical sensor and spectral/radiometric illumination for pixels of the at least one exposure of the object.

2. The system of claim 1, wherein the determined spectral/radiometric illumination is representative of atmosphere radiation in exposures captured by the at least one electro-optical sensor.

3. The system of claim 1, wherein the data for the at least one exposure detected by the at least one electro-optical sensor comprises an intensity count for a plurality of spatial pixels for at least one spectral band detected by the at least one electro-optical sensor.

4. The system of claim 3, wherein the at least one spectral band is between 400 nm and 2.5 µm.

5. The system of claim 1, wherein the at least one characteristic of the object comprises a spectral reflectivity of the object determined directly from a plurality of exposures of the object detected by the at least one electro-optical sensor, and wherein a value for each pixel of the plurality of exposures of the object is compared to a corresponding pixel value from the at least one exposure of the diffuse reflector surface.

6. The system of claim 1, wherein the at least one reflective member comprises a diffuse reflector mirror.

7. The system of claim 1, further comprising an arm supporting the at least one reflective member, which holds the at least one reflective member a fixed distance from the at least one electro-optical sensor.

8. The system of claim 1, further comprising a protective cover mounted to the at least one reflective member, the at least one protective cover being configured to transition between an extended position, in which the at least one protective cover is over the diffuse reflector surface, and a retracted position, in which the at least one protective cover is spaced apart from the diffuse reflector surface exposing the diffuse reflector surface to the field of view of the electro-optical sensor.

9. The system of claim 1, further comprising at least one temperature sensor configured to detect a temperature of the diffuse reflector surface of the at least one reflective member, and wherein the at least one temperature sensor is mounted to the at least one reflective member.

10. The system of claim 9, wherein the at least one temperature sensor is spaced apart from the at least one reflective member, the system further comprising a thermally conductive member extending between the diffuse reflector surface and the at least one temperature sensor, so that a temperature of the diffuse reflector surface is measured by the spaced apart temperature sensor.

11. The system of claim 9, wherein the at least one electro-optical sensor comprises at least one infrared sensor configured to detect infrared radiance, and wherein the calibration parameters for the infrared sensor are based, at least in part, on data detected by the at least one infrared sensor, a temperature of the diffuse reflector surface measured by the at least one temperature sensor, and known emissivity of the diffuse reflector surface at the measured temperature.

12. The system of claim 1, wherein the instructions cause the processor to adjust the field of view of the at least one electro-optical sensor to obtain the at least one exposure of the object by processing obtained exposures by the at least one electro-optical sensor to identify the at least one exposure including a target known to be proximate to the diffuse reflector surface.

13. An optical sensing system comprising:
   at least one electro-optical sensor comprising an adjustable field of view;
   at least one reflective member comprising a diffuse reflector surface positioned within the field of view of the at least one electro-optical sensor;
   a protective cover mounted to the at least one reflective member, the at least one protective cover being configured to transition between an extended position, in which the at least one protective cover is over the diffuse reflector surface, and a retracted position, in which the at least one protective cover is spaced apart from the diffuse reflector surface exposing the diffuse reflector surface to the field of view of the electro-optical sensor;
   at least one narrow band illumination source connected to the protective cover; and
   at least one controller comprising a processor and computer readable memory comprising instructions that when executed cause the processor to:
   adjust a position of the field of view of the at least one electro-optical sensor so that the at least one narrow band illumination source is within the field of view, thereby also positioning the at least one reflective member within the field of view of the at least one electro-optical sensor, and
   generate calibration parameters for the at least one electro-optical sensor based on data for at least one exposure detected by the at least one electro-optical sensor when the protective cover is in the retracted position and the diffuse reflector surface is within the field of view of the at least one electro-optical sensor.

14. The system of claim 13, wherein after the calibration parameters are calculated, the instructions cause the processor to:
- adjust a position of the field of view of the at least one electro-optical sensor so that an object to be identified is within the field of view; and
- cause the at least one electro-optical sensor to detect data for the at least one exposure when the object to be identified is within the field of view of the at least one electro-optical sensor.

15. The system of claim 14, wherein the data for the at least one exposure when the object to be identified is within the field of view comprises an intensity count for each of a plurality of pixels for at least one spatial band, and
- wherein the instructions cause the processor to determine an absolute reflectivity for each pixel for the object to be identified based on the calibration parameters and the intensity count for each of the plurality of pixels.

16. The system of claim 15, wherein the absolute reflectivity for each pixel in the object is further based on a dark level for the plurality of pixels, and wherein the instructions cause the processor to compare the determined absolute reflectivity for each pixel for the object to be identified to reflectivity values for known objects to identify the object to be identified.

17. A method for calculating calibration parameters for at least one electro-optical sensor and for determining at least one characteristic of an object in at least one exposure captured by the at least one electro-optical sensor, the method comprising:
- adjusting a field of view of the at least one electro-optical sensor to obtain at least one exposure of a diffuse reflector surface by the at least one electro-optical sensor;
- determining an intensity count for a plurality of pixels for at least one spectral band for the at least one exposure with the diffuse reflector surface within the field of view of the at least one electro-optical sensor;
- adjusting the field of view of the at least one electro-optical sensor to obtain at least one exposure of the object; and
- determining at least one characteristic of the object based on the determined intensity count for the plurality of pixels with the diffuse reflector surface within the field of view of the at least one electro-optical sensor and spectral/radiometric illumination for pixels of the at least one exposure of the object.

18. The method of claim 17, further comprising detecting dark levels in pixels of the at least one exposure of the diffuse reflector surface, wherein calculating the calibration parameters comprises removing the detected dark levels from the determined intensity counts for the plurality of pixels.

19. The method of claim 17, wherein adjusting the field of view of the at least one electro-optical sensor to obtain the at least one exposure of the diffuse reflector surface comprises processing obtained exposures by the at least one electro-optical sensor to identify the at least one exposure including a target known to be proximate to the diffuse reflector surface.

20. A method for directly measuring reflectivity of objects in a scene with at least one electro-optical sensor, the method comprising:
- adjusting a field of view of the at least one electro-optical sensor to obtain at least one exposure with a diffuse reflector surface within the field of view of the at least one electro-optical sensor;
- determining an intensity count for a plurality of pixels for at least one spectral band for the at least one exposure with the diffuse reflector surface within the field of view of the at least one electro-optical sensor;
- adjusting the field of view of the at least one electro-optical sensor to obtain at least one exposure of an object to be identified within the adjusted field of view;
- obtaining at least one exposure including the object to be identified with the at least one electro-optical sensor;
- determining an intensity count for a plurality of pixels for the at least one spectral band for the obtained at least one exposure of the object to be identified; and
- dividing the intensity counts for pixels including the object to be identified by the intensity counts for pixels including the diffuse reflector surface to provide a direct measure of reflectivity of a surface of the object to be identified.

* * * * *